Patented June 11, 1940

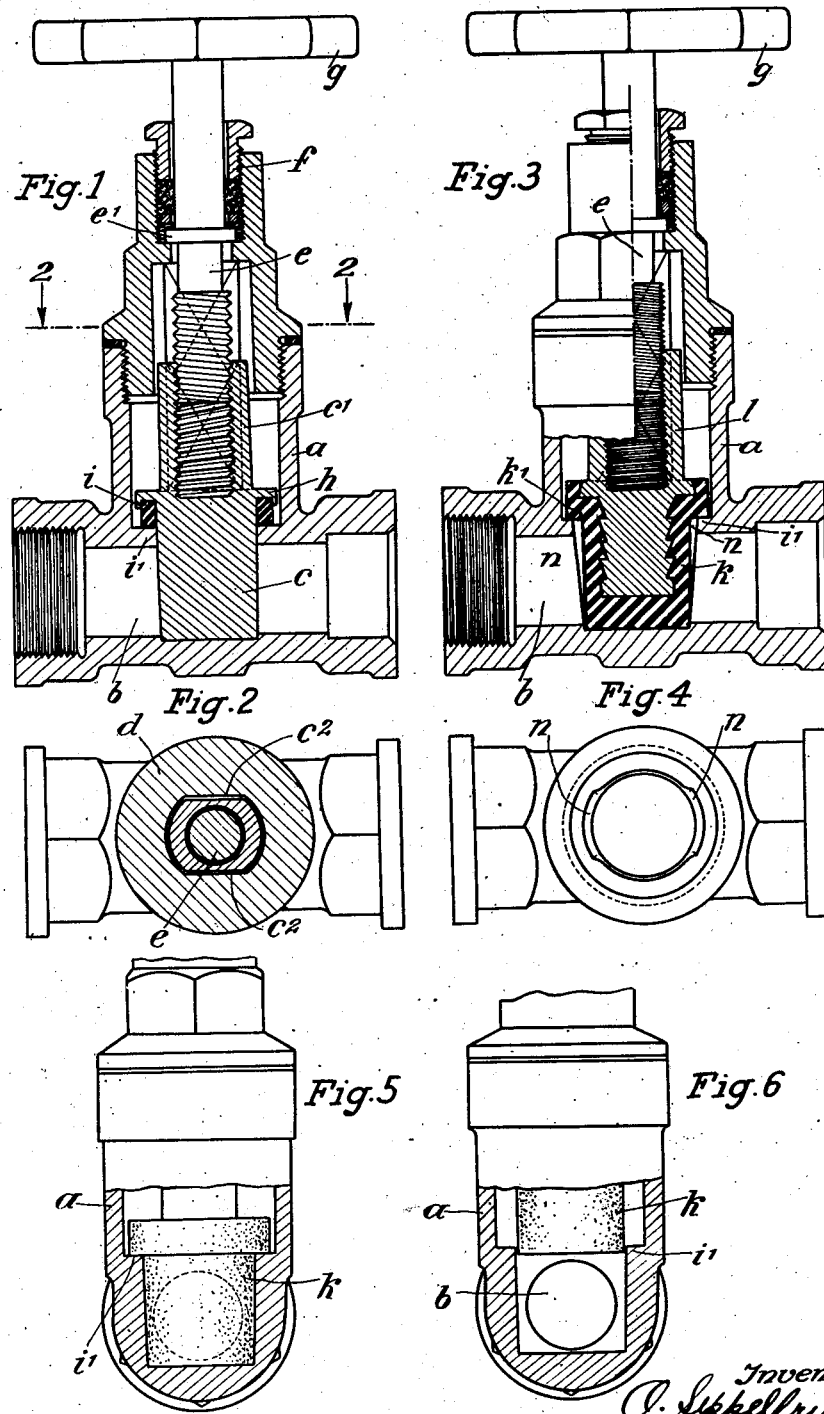

2,204,452

UNITED STATES PATENT OFFICE 2,204,452

STOPCOCK

Otto Seppelfricke, Gelsenkirchen, Germany

Application March 30, 1938, Serial No. 198,989
In Germany March 31, 1937

2 Claims. (Cl. 251—59)

This invention relates to a stopcock, in which the passage is closed or completely uncovered by means of a conical slide which is acted upon by a screw gear.

In stopcocks of this character difficulties are sometimes encountered in the sealing of the slide member. If it is ground properly to fit the slide casing, it is possible to press the same so tightly into the opening of the casing by means of the screw gear that upon the release the thread of the gear may be destroyed. If the two co-operating parts are not properly ground in conical form, a good seal is not obtained.

According to the invention the advantages of a stopcock, viz., a free cross-section of the passage in the open position, are combined with those of a disc valve by the fact that the conical slide member is furnished above its conical seating portion with a flange, which is provided on its outer periphery with a downwardly projecting edge and carries a flexible washer.

It has been proposed in the past to make the conical slide member of an elastic material, such as vulcanized rubber. It has been found, however, that under strong pressure the flexible conical slide is squeezed partially into the openings of the casing seating, so that it cannot again be removed without damage to the same.

According to an additional feature of the invention this disadvantage is overcome by the fact that the seating area of the casing adapted to receive a slide composed of a flexible material is recessed in the vicinity of the passage openings according to a larger truncated cone than the remaining peripheral area of the hollow conical seating.

In this way the flexible material of the slide is deprived of the possibility of squeezing at certain points in calotte-like fashion into the openings of the passage and thus obstructing the lifting of the slide into the ineffective position.

Certain embodiments of the invention are illustrated by way of example in the accompanying drawing.

Fig. 1 shows a stopcock according to the invention in longitudinal section.

Fig. 2 is a section along the line II—II in Fig. 1.

Fig. 3 is a view similar to Fig. 1 showing a modified embodiment of stopcock in which the blocking member of the cock is composed of a flexible or elastic material, such as vulcanized rubber.

Fig. 4 is a plan view of the casing with the threaded spindle guide removed.

Figs. 5 and 6 are elevational views, partially in section, showing the slide according to Figs. 3 and 4 in the closed and open positions respectively.

In the embodiment according to Fig. 1 the casing $a$ is furnished transversely to the passage $b$ with a hollow conical recess for reception of the conical slide $c$, which is secured against rotation by an extension $c^1$, which is flattened on two sides and is disposed between faces $c^2$, parallel thereto, of the spindle support $d$, the latter being screwed on to the casing in conventional fashion. The slide $c$, by means of the tubular extension $c^1$, is in operative connection with a threaded spindle $e$, which in the known manner is secured against axial displacement by a collar $e^1$ and two bearing faces co-operating therewith and situated below the stuffing box $f$. The spindle $e$ terminates at the top in a handwheel $g$.

At the upper end of the slide $c$ there is provided a flange $h$ having a downwardly projecting edge, below which there is held in position a flexible washer $i$ co-operating in the manner of a valve disc with an annular seating $i^1$ of the casing $a$.

In the embodiment according to Figs. 3 to 6 there is provided in place of the conical slide $c$ composed of metal or another rigid material a conical slide member $k$ consisting of an elastically flexible material, with which the washer $k^1$ co-operating with the annular seating $i^1$ of the casing $a$ is preferably integral. This slide $k$ is connected in the conventional manner to the extension sleeve $l$ which, as in Fig. 1, is lifted and lowered through the medium of the threaded spindle $e$ by turning the handwheel $g$. To prevent the flexible material of the conical slide $k$ from being able upon the closing operation to wedge into the passage openings in the casing the conical seating area in the casing is formed in the neighbourhood of the openings according to a truncated cone, the base of which possesses a larger diameter than the cone according to which the remaining seating area of the casing is formed, so that at these points there are produced intermediate spaces $n$ (Fig. 4), which prevent the material of the slide $k$ from squeezing into the passages $b$.

Fig. 5 shows the frustro-conical slide $k$ in the closed position, and Fig. 6 in the open position, in which the passage $b$ is completely uncovered.

What I claim as new and desire to secure by Letters Patent is:

1. In a stopcock, a cock casing, a conical slide adapted to reciprocate within the said casing for opening and closing the passage in the cock, means for lifting and lowering the said slide, a conical seating in the said casing adapted to receive the said slide in the closed position of the cock, the said seating in the neighbourhood of the said passage being produced according to a truncated cone, the base of which has a larger diameter than the truncated cone according to which the remainder of the seating is formed so as to leave a spacing between the mouth of the said passage and the wall of the said slide, a peripheral flange forming a part of said slide above its conical face portion, and an annular seating in the said casing to receive the said flange in the closed position of the cock.

2. In a stopcock, a casing having a portion provided with a fluid passage and a lateral portion constituting a hollow guide opening at one end into the passage, the said guide at said end having a diameter greater than the opening leading into the passage and forming a washer seating, a slide of conical form movable through said opening into the passage for opening and closing the passage, means at one end of said slide forming a washer thereabout which remains at all times within the guide and is adapted to position on said washer seating when the slide is in the closed position in the passage, means in the guide and coupled with said slide for effecting reciprocation of the slide, and a conical seating formed in the casing across the passage and adapted to receive the slide in the closed position thereof, the said slide and the washer forming means being a unitary body of deformable material, the said conical seating having recesses formed in opposite faces, through which said passage passes, which recesses prevent the material of the slide being pressed into the adjacent ends of the passage when the cock is closed.

OTTO SEPPELFRICKE.